US011659052B2

(12) United States Patent
Lundgren et al.

(10) Patent No.: US 11,659,052 B2
(45) Date of Patent: May 23, 2023

(54) SELECTIVE POLICY NETWORK DEVICE OPERATION

(71) Applicant: Extreme Networks, Inc., San Jose, CA (US)

(72) Inventors: William Edward Lundgren, Cedar Grove, WI (US); Alan Cuellar Amrod, Jupiter, FL (US); Krishnamoorthy Narayanan, Milpitas, CA (US); Richard Stephen Hector, Tampa, FL (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

(21) Appl. No.: 17/181,006

(22) Filed: Feb. 22, 2021

(65) Prior Publication Data

US 2021/0185148 A1 Jun. 17, 2021

Related U.S. Application Data

(63) Continuation of application No. 15/282,064, filed on Sep. 30, 2016, now Pat. No. 10,944,849.

(51) Int. Cl.
*G06F 15/16* (2006.01)
*H04L 67/00* (2022.01)
(Continued)

(52) U.S. Cl.
CPC .......... *H04L 67/34* (2013.01); *H04L 41/0806* (2013.01); *H04L 41/0893* (2013.01);
(Continued)

(58) Field of Classification Search
CPC . H04L 67/34; H04L 41/0806; H04L 41/0893; H04L 67/02; H04L 67/1002; H04L 67/26; H04W 28/0231
(Continued)

(56) References Cited

U.S. PATENT DOCUMENTS 7,339,892 B1 * 3/2008 Engwer ............ H04W 28/0231
370/235
8,051,324 B1 11/2011 Zhao et al.
(Continued)

FOREIGN PATENT DOCUMENTS

WO WO-2014175923 A1 * 10/2014 ......... H04L 65/1016

OTHER PUBLICATIONS

Eddy, Nathan, "Tablet Adoption Growing Among Small Businesses," May 4, 2012 [retrieved online at http://www.eweek.com/mobile/tablet-adoption-growing,among-small -businesses on Dec. 19, 2017].
(Continued)

*Primary Examiner* — Karen C Tang
(74) *Attorney, Agent, or Firm* — Sterne, Kessler, Goldstein & Fox P.L.L.C.

(57) ABSTRACT

Techniques for synchronizing a network device to selectively operate according to a selectable operation policy. A system utilizing such techniques can a self-configuring network device operation coordination system and a self-configuring network device operation management system. A method utilizing such techniques can include synchronizing a network device to selectively operate according to a first operation policy and a second operation policy in providing network service access.

20 Claims, 9 Drawing Sheets

(51) Int. Cl.
  *H04L 67/02* (2022.01)
  *H04L 41/0806* (2022.01)
  *H04L 41/0893* (2022.01)
  *H04L 67/55* (2022.01)
  *H04L 67/1001* (2022.01)
  *G06F 15/173* (2006.01)
  *H04W 28/02* (2009.01)

(52) U.S. Cl.
  CPC .......... *H04L 67/02* (2013.01); *H04L 67/1001* (2022.05); *H04L 67/55* (2022.05); *H04W 28/0231* (2013.01)

(58) Field of Classification Search
  USPC ........................................................ 709/225
  See application file for complete search history.

(56) References Cited

U.S. PATENT DOCUMENTS

| | | |
|---|---|---|
| 9,154,247 B2 | 10/2015 | Altman |
| 9,276,665 B1 | 3/2016 | Johnson et al. |
| 9,319,913 B2 | 4/2016 | Raleigh et al. |
| 9,674,731 B2 | 6/2017 | Raleigh et al. |
| 9,699,646 B2 | 7/2017 | Poon et al. |
| 9,712,401 B2 | 7/2017 | Wright et al. |
| 9,749,899 B2 | 8/2017 | Raleigh et al. |
| 9,794,266 B2 | 10/2017 | Faccin et al. |
| 9,807,644 B2 | 10/2017 | Ma et al. |
| 9,838,269 B2 | 12/2017 | Wright et al. |
| 9,942,796 B2 | 4/2018 | Raleigh |
| 2003/0154272 A1 | 8/2003 | Dillon et al. |
| 2010/0316012 A1* | 12/2010 | Stanwood ........... H04L 41/5035 370/329 |
| 2011/0119413 A1 | 5/2011 | Gulati et al. |
| 2012/0089727 A1 | 4/2012 | Raleigh et al. |
| 2012/0231785 A1 | 9/2012 | Poon et al. |
| 2013/0086265 A1 | 4/2013 | Bao et al. |
| 2013/0272227 A1 | 10/2013 | Gallagher |
| 2014/0199962 A1 | 7/2014 | Mohammed et al. |
| 2015/0236926 A1 | 8/2015 | Wright et al. |
| 2015/0237519 A1 | 8/2015 | Ghai |
| 2015/0349917 A1* | 12/2015 | Skaaksrud ............ H04W 8/183 370/328 |
| 2016/0021571 A1* | 1/2016 | Bansal ............ H04W 36/00835 370/236 |
| 2016/0044106 A1 | 2/2016 | Kjendal et al. |
| 2016/0269928 A1 | 9/2016 | Kotecha et al. |
| 2016/0360489 A1 | 12/2016 | Boodannavar |
| 2017/0366680 A1 | 12/2017 | Raleigh et al. |
| 2018/0097911 A1 | 4/2018 | Lundgren et al. |
| 2018/0146395 A1 | 5/2018 | Kotecha et al. |

OTHER PUBLICATIONS

King, Rachel, "Tablet Adoption to Grow by 40 Percent by 2016, Report Says," Apr. 18, 2012 [retrieved online at http://www.zdnet.com/article/tablet-adoption-to-grow-by-40-percent-by-2016-report-says/on Dec. 19, 2017].

Mandalia, Ravi, "Apple Retina MacBook Pro Gets Haswell Chips, 802.11ac Wi-Fi and a Lower Price," Oct. 24, 2013 [retrieved online at http://www.modernreaders.com/apple-retina-macbook-pro-gets-haswell-chips-802-11ac-wi-fi-and-a-lower-price/991/ravim on Dec. 19, 2017].

* cited by examiner

SELECTIVE POLICY NETWORK DEVICE OPERATION

RELATED APPLICATIONS

This application is a continuation of U.S. application Ser. No. 15/282,064, filed on Sep. 30, 2016, the contents of which are hereby incorporated by reference.

DETAILED DESCRIPTION

Figure 1:
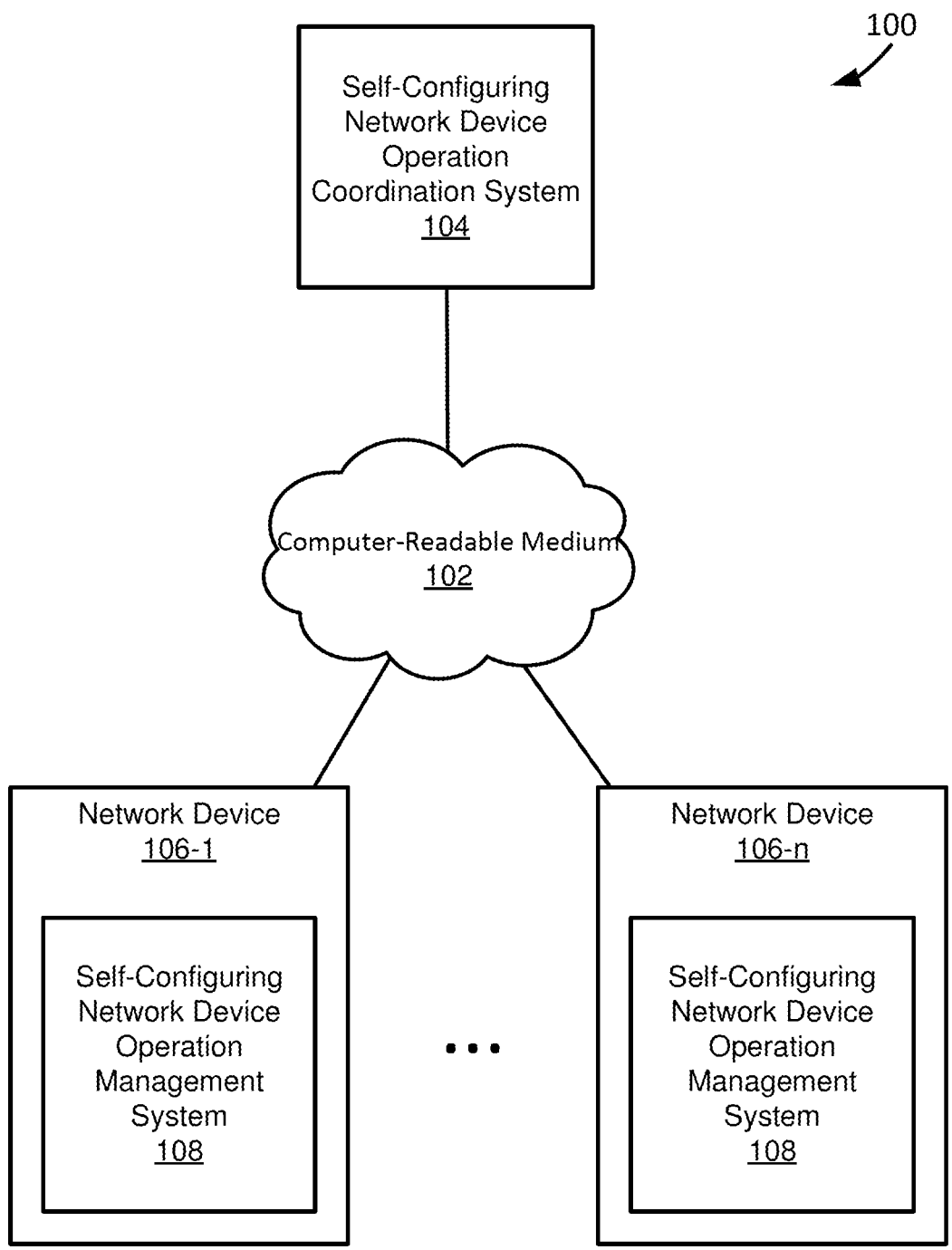
FIG. 1 depicts a diagram of an example of a system for providing access to network services using network devices capable of operating according to different operation policies.

FIG. 1 depicts a diagram 100 of an example of a system for providing access to network services using network devices capable of operating according to different operation policies. The diagram 100 includes a computer-readable medium 102, a self-configuring network device operation coordination system 104, and network device 106-1 . . . network device 106-n (hereinafter referred to as "network devices 106"). In the example system shown in FIG. 1, the self-configuring network device operation coordination system 104 and the network devices 106 are coupled to each other through the computer-readable medium 102. Additionally, in the example system shown in FIG. 1, the network devices include a self-configuring network device operation management system 108.

A computer-readable medium, as discussed in this paper, is intended to represent a variety of potentially applicable technologies. For example, a computer-readable medium can be used to form a network or part of a network. Where two components are co-located on a device, a computer-readable medium can include a bus or other data conduit or plane. Where a first component is co-located on one device and a second component is located on a different device, a computer-readable medium can include a wireless or wired back-end network, LAN, or WLAN. A computer-readable medium can also encompass a relevant portion of a WAN or other network, if applicable.

Assuming a computer-readable medium includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (hereinafter referred to as "HTTP") for hypertext markup language (hereinafter referred to as "HTML") documents that make up the World Wide Web (hereinafter referred to as "the web"). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

A computer-readable medium and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

A computer-readable medium and other applicable systems or devices described in this paper can be implemented as a computer system or parts of a computer system or a plurality of computer systems. A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to devices. For example, the computing resources, software and/or information can be virtualized by maintaining centralized services and resources that devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors, at least partially implemented in hardware, or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include software embodied in a computer-readable medium, firmware, or hardware for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Referring once again to the example of FIG. 1, the self-configuring network device operation coordination system 104 is intended to represent a system that functions to manage coordination of network devices to operate according to different operation policies. In a specific implementation, network device operational parameters defined by multiple selectable operation policies fixed by a user/administrator. For example, an administrator can fix a network device operational parameter of a selectable operation policy to indicate allowing a maximum of two hundred client devices to access network services through a network device at any given time. In another example, an administrator can fix a network device operational parameter of a selectable operation policy to allow a network device to indicate providing network service access to client devices at a maximum bit rate of 500 Mbps. In an alternative example, an administrator can fix a network device operational parameter of a selectable operation policy to indicate allowing unlimited bandwidth to specific users in accessing network services. In yet another example, an administrator can fix a network device operational parameter of a selectable operation policy to indicate powering off a 2.4 GHz radio within a network device providing network service access.

In managing coordination of network devices to operate according to different operation policies, the network devices can be self-configured to switch operating between different selectable operation policies, e.g. a factory default operation policy and a density-based operation policy. Density-based, as used in this paper, refers to a load density at which a network device is operating in providing network service access. A load density on a network device in providing access to network services can be based on either or both a number of client devices being served and bandwidth consumed by a client device in accessing network services through a network device. For example, if a network device is providing network service access to one thousand client devices at an average bit rate across the client devices of two thousand Mbps, then the network device can be characterized as operating under a high load density. Alternatively, if a network device is providing network service access to ten client devices at an average bit rate across the client devices of one hundred Mbps, then the network device can be characterized as operating under a low load density.

In managing coordination of network devices according to density-based operation policies, the self-configuring network device operation coordination system 104 can define a density-based operation policy for a network device. For example, the self-configuring network device operation coordination system 104 can generate and/or update density-based operation policy data indicating a density-based operation policy for a network device. Further in managing coordination of network devices according to density-based operation policies, the self-configuring network device operation coordination system 104 can send a defined density-based operation policy to a network which can be used to configure the network device to provide access to network services according to the density-based operation policy.

A selectable operation policy, e.g. a density-based operation policy, defines network device operational parameters according to which a network device operates when providing access to network services according to the selectable operation policy. Network device operational parameters include applicable operational parameters in accordance with which a network device can operate in providing network service access. Example network device operational parameters include: a number of client devices to which a network device can provide network service access at a specific time, an amount of bandwidth a client device can consume in accessing network services through a network device, setting frequency band channel width in providing network service access, e.g. set channel width of channels within the 2.4 GHz and 5 GHz frequency bands to 20 MHz, whether to perform background channel scans, whether to provide backhaul failover, whether to provide wireless intrusion prevention, forcing data rates for all SSIDs to be at specific rates, whether to use short guard intervals, whether to use transmission beamforming, whether to use frame-bursting, managing network service access according to a QoS profile, managing network service access according to specific users, overriding all or a portion of a QoS profile to provide the same service level to all or a subset of users or types of provisioned network services, managing distribution of network service provisioning to neighboring network devices, e.g. physical location neighbors and/or network location neighbors, controlling power to a network device or components of a power device.

Density-based operation policies are specific to load densities at which network devices are operating or otherwise capable of operating. For example, a density-based operation policy can be specific to a load density of network devices in providing network service access to one thousand client devices at an average bit rate across the client devices of five hundred Mbps. Additionally, density-based operation policies can be specific to a rage of load densities at which network devices are operating or otherwise capable of operating. For example, a density-based operation policy can be specific to a range of load densities of network devices in providing network service access to between five hundred and one thousand client devices at an average bit rate across the client devices between one hundred Mbps and five hundred Mbps. Selectable operation policies that are not density-based can include those that are responsive to noise levels and VIP devices, such as those selected when the CEO of a company is connected to a network device.

A network device providing or capable of providing access to network services at a load density or range of load densities can be configured to operate according to a density-based operation policy specific to the load density or range of load densities. A density-based operation policy can be specific to a low load density or range of low load densities, referred to as a low density operation policy, and the policy can be used to configure a network device to provide access to network services when the network device is operating at the low load density or within the range of low load densities. Additionally, a density-based operation policy can be specific to a high load density or range of high load densities, referred to as a high density operation policy, and the policy can be used to configure a network device to provide access to network services when the network device is operating at the high load density or within the range of high load densities. An example of a density-based operation policy specific to high load densities or a range of high load densities can define one or an applicable combination of the following example network device operational parameters: force channel widths in the 2.4 and 5 GHz frequency bands to a 20 MHz channel width, disabling background channel scans, disabling backhaul failover, disabling wireless intrusion prevention, forcing all data rates for all SSIDs to have factory default basic/optional support for all data rates, enabling use of short guard intervals, enabling transmission beamforming, enabling frame-bursting, overriding all user-profile QoS actions, to set a per-user rate limit as specified by an administrator, and overriding per radio profiles and per-SSID client limits to enforce a maximum network device count as specified by an administrator.

In a specific implementation, self-configuring network devices dynamically change operation parameters of a network device in providing network service access in response to environmental conditions. In dynamically changing operation parameters of a network device, the network device can selectively operate according to different operation policies in providing access to network services. For example, using selectable operation policies, a network device can be configured to selectively switch from operating according to a first operation policy, e.g. a factory default operation policy, or according to a second operation policy, e.g. a high density operation policy based on a load density on the network device, in providing network service access. Selectable operation policies can be loaded onto a network device, as part of synchronization of network devices to operate according to self-configuring operation policies, to allow a network device to dynamically configure itself to operate according to a density-based operation policy in response to a load density on the network device, as indicated by operational performance of the network device.

In a specific implementation, the self-configuring network device operation coordination system 104 functions to set performance triggers for selectable operation policies. In setting performance triggers, the self-configuring network device operation coordination system 104 can update operation policy data for a selectable operation policy to indicate performance triggers for the selectable operation policy. Performance triggers are associated with selectable operation policies that function to signal a network device to configure itself to operate, prepare to operate or to stop operating according to the selectable operation policies in response to the performance triggers being activated. For example, if performance triggers associated with a selectable operation policy are met as a network device is providing network service access, then the network device can start operating according to the selectable operation policy in continuing to provide network service access. In another example, if performance triggers associated with a selectable operation policy signifying to stop operating according to the selectable operation policy are met as a network device is providing network service access according to a selectable operation policy, then the network device can start revert to operating according to a previously used operation policy, e.g. a factory default operation policy.

Performance triggers include applicable performance trigger parameters of a network device operating to provide network service access. Example performance trigger parameters include: a number of client devices being served, bandwidth consumption of client devices in accessing network services, neighboring network device transmission powers, radio errors experienced in providing network service access, transmission retry rates, computational processing utilization in providing network service access, power consumption levels of a network device, memory utilization of a network device in providing network service access, error conditions and occurrences in providing network service access, channel changes of client devices in accessing network services, client devices with particular profiles (e.g., VIP), client device RSSI levels, noise, and other parameters that signify a particular operation policy may be appropriate at a given time. For example, a density-based performance trigger can specify one hundred or more client devices triggers a network device to switch to operating according to a high density operation policy when the network device is providing network service access to the one hundred or more client devices.

In a specific implementation, the self-configuring network device operation coordination system 104 functions to receive performance statistics of a network device in providing network service access. Performance statistics, as indicated by network device performance statistics data, include performance parameters of a network device in actually operating to provide network service access. For example, performance statistics can indicate a number of client devices a network device served in providing network service access during a twenty-four hour time span. Further in the example, the performance statistics can indicate a number of the client devices served by the network device at any given time within the twenty-four hour time span. Performance statistics for a network device can be received by the self-configuring network device operation coordination system 104 from the network device itself or an applicable network device within a LAN. For example, a network device can monitor itself to generate performance statistics for itself, and subsequently provide the performance statistics to the self-configuring network device operation coordination system 104.

In a specific implementation, the self-configuring network device operation coordination system 104 functions to generate density-based operation policies based on received performance statistics of one or a plurality of network devices. The self-configuring network device operation coordination system 104 can use received performance statistics to generate performance triggers used to facilitate selection of selectable operation policies. For example, if performance statistics indicate a network device serves a maximum of one thousand clients in providing network service access, then the self-configuring network device operation coordination system 104 can set a performance trigger for a high density operation policy for the network device at eight hundred client devices being currently served.

In a specific implementation, the self-configuring network device operation coordination system 104 functions to generate a selectable operation policy including a standby notification command. A standby notification command is an operational parameter instructing a network device to send standby notifications to neighboring network devices. A standby notification can function to serve as a performance trigger. For example a standby notification can cause a neighboring network device to prepare to operate according to a high density operation policy or otherwise begin operating according to a different policy, e.g. an intermediate policy between a high density and factory default or low density operation policy.

In a specific implementation, a standby notification can function to modify a performance trigger. For example, a standby notification can serve to lower load density requirements for triggering operation according to a high density operation policy. Further in the example, if a high density operation policy has a density-based performance trigger of 50% of the average client devices served by a network device, then a standby notification can modify the density-based performance trigger to 20% of the average client devices. In using a standby notification to lower the load density requirements for triggering operation according to a high density operation policy, network devices can more rapidly accommodate an increasing load density while the load density continues to increase. A standby notification can function to temporarily modify a performance trigger. For example, a standby notification can serve to lower load density requirements for triggering operation according to a high density operation policy, and if the lowered load density requirements are not met for five minutes, then the load density requirement for triggering operation according to the high density operation policy can return to the original load density requirements.

In a specific implementation, the self-configuring network device operation coordination system 104 to provide an interface to an administrator through which an administrator can control coordinating network devices to operate according to selectable operation policies. Using the self-configuring network device operation coordination system 104, an administrator can control what selectable operation policies are sent to specific network devices and which network devices can be configured to operate according to a selectable operation policy. Additionally, using the self-configuring network device operation coordination system 104, an administrator can set network device operational parameters defined within selectable operation policies. For example, an administrator can set a high density policy to allow specific users unlimited bandwidth in accessing network services through a network device operating according to the policy. Further, using the self-configuring network device operation coordination system 104, an administrator can add a standby command to a selectable operation policy.

In the example of FIG. 1, the network devices 106 are intended to represent devices that function to send and receive data in providing client devices network service access through WLANs. The network devices 106 and other network devices described in this paper can include or function as routers, switches, access points, gateways, including wireless gateways, repeaters, or a combination thereof. In functioning as gateways, the network devices 106 can transport data from a back-end of a network to devices coupled to the network devices 106. In functioning as access points, the network devices 106 can couple client devices coupled to the network devices 106 to a network associated with the network devices. In various implementations, the network devices 106 function to provide or facilitate providing of wireless network service access according to applicable protocols for forming part of a wireless network, including Wi-Fi, such as the IEEE 802.11 standards.

In a specific implementation, the network devices 106 act as or include stations, by including a wireless interface through which client devices can access network services. A station, as used in this paper, can be referred to as a device with a media access control (MAC) address and a physical layer (PHY) interface to a wireless medium that complies with the IEEE 802.11 standard. IEEE 802.11a-1999, IEEE 802.11b-1999, IEEE 802.11g-2003, IEEE 802.11-2007, IEEE 802.11n TGn Draft 8.0 (2009), and IEEE 802.11ac-2013 are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative implementations, a station may comply with a different standard than Wi-Fi or IEEE 802.11, may be referred to as something other than a "station," and may have different interfaces to a wireless or other medium.

IEEE 802.3 is a working group and a collection of IEEE standards produced by the working group defining the physical layer and data link layer's MAC of wired Ethernet. This is generally a LAN technology with some wide area network applications. Physical connections are typically made between nodes and/or network devices, e.g. infrastructure network devices (hubs, switches, routers), by various types of copper or fiber cable. IEEE 802.3 is a technology that supports the IEEE 802.1 network architecture. As is well-known in the relevant art, IEEE 802.11 is a working group and collection of standards for implementing WLAN computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

Referring once again to the example of FIG. 1, the network devices 106 can use an applicable protocol for communicating with each other, e.g. the Aerohive® mobility routing protocol (hereinafter referred to as "AMRP"). The network devices 106 can communicate using a network back-end or through wireless connections directly connecting the network devices 106 together, e.g. as part of a mesh network.

The network devices 106 function according to one or a combination of applicable operation states. Network device operation states can include, the network devices 106 providing client devices network service access, the network devices 106 directly connected to each other and sending and received data to and from each other to form a mesh network, the network devices 106 acting as client devices by accessing network services through other network devices, and the network devices 106 discovering users of client devices. For example, the network devices 106 can determine a specific person is accessing network services based on a profile of a user indicating an identification of a client device associated with the user.

In the example of FIG. 1, the self-configuring network device operation management system 108 is intended to represent a system that functions to configure a network device to operate according to a policy, e.g. a density-based operation policy, in providing network service access. The self-configuring network device operation management system 108 can configure a network device by dynamically changing operational parameters of the network device in providing network service access, thereby allowing the network device to selectively operate according to different policies. In configuring a network device to operate according to a policy in providing network service access, the self-configuring network device operation management system 108 can control systems and/or hardware within the network device according to the policy. For example, the self-configuring network device operation management system 108 can disable a 2.4 GHz radio of the network device. In another example, the self-configuring network device operation management system 108 can instruct an applicable system for managing channel width at a network device to reduce channel width of the network device in providing network service access.

In a specific implementation, the self-configuring network device operation management system 108 functions to receive operation policy data. The self-configuring network device operation management system 108 can receive operation policy data from an applicable system for coordinating network devices to provide network service access according to an operation policy. The self-configuring network device operation management system 108 can use received operation policy data to configure a network device to provide network service access according to a operation policy indicated by the operation policy data.

In a specific implementation, the self-configuring network device operation management system 108 functions to determine if performance triggers have been met. The self-configuring network device operation management system 108 can determine if performance triggers have been met based on performance parameters of a network device in providing network service access. For example, if the self-configuring network device operation management system 108 determines a network device is providing network service access to one hundred client devices and a density-based performance trigger indicates serving of one hundred client devices, then the self-configuring network device operation management system 108 can determine the density-based performance trigger has been met. In another example, if the self-configuring network device operation management system 108 determines a network device is operating above a threshold number of error occurrences, then the self-configuring network device operation management system 108 can determine a self-configuring performance trigger has been met.

In a specific implementation, the self-configuring network device operation management system 108 functions to determine if performance triggers have been met for purposes of configuring a network device to operate, prepare to operate, or stop operating according to a selectable operation policy. For example, if the self-configuring network device operation management system 108 determines performance triggers signifying to start operating according to an operation policy have been met, then the self-configuring network device operation management system 108 can configure the network device to operate according to the operation policy. In another example, if the self-configuring network device operation management system 108 determines density-based performance triggers signifying to revert from operating according to a high density operation policy back to a previously used operation policy have been met, then the self-configuring network device operation management system 108 can dynamically configure a network device to operate according to a previously used operation policy.

In a specific implementation, the self-configuring network device operation management system 108 functions to generate performance statistics. Performance statistics, as indicated by network device performance statistics data, can be provided by the self-configuring network device operation management system 108 for use in coordinating network devices to operate according to operation policies. For example, performance statistics generated and provided by the self-configuring network device operation management system 108 can be used to generate performance triggers as part of operation policies. The self-configuring network device operation management system 108 can generate performance statistics for a network device during operation over pre-set time intervals and/or at pre-set times. For example, the self-configuring network device operation management system 108 can generate performance statistics for a network device based on network device operations every five minutes over a time span of twenty-four hours.

In a specific implementation, the self-configuring network device operation management system 108 functions to determine neighboring network devices to a network device. Neighboring network devices can include network devices neighboring a network device based on physical location. The self-configuring network device operation management system 108 can use an applicable method and/or systems to determine neighboring network devices. The self-configuring network device operation management system 108 can use an automatic channel selection process (hereinafter referred to as "ACSP") to determine neighboring network devices. Additionally, the self-configuring network device operation management system 108 can determine if network devices are neighboring network devices based on signal strengths of signals received from the network devices. For example, if a strength of a signal received from a network device falls below a threshold value, e.g. −70 dbM or a specific RSSI value, then the self-configuring network device operation management system 108 can determine the network device is not a neighboring network device.

In a specific implementation, the self-configuring network device operation management system 108 functions to send standby notifications to neighboring network devices. The self-configuring network device operation management system 108 can send standby notifications in response to a standby notification command included in a operation policy. For example, if the self-configuring network device operation management system 108 configures a network device to operate according to a selectable operation policy, and the selectable operation policy includes a standby notification command, then the self-configuring network device operation management system 108 can send standby notifications to neighboring network devices.

In a specific implementation, the self-configuring network device operation management system 108 functions to receive standby notifications. The self-configuring network device operation management system 108 can receive standby notifications from network device neighboring a network device upon which the self-configuring network device operation management system 108 is implemented. For example, the self-configuring network device operation management system 108 can receive a standby notification from a neighboring network device operating according to a selectable operation policy.

In a specific implementation, the self-configuring network device operation management system 108 functions to configure a network device to operate in a standby mode in response to a received standby notification. In configuring a network device to operate in a standby mode in response to a received standby notification, the self-configuring network device operation management system 108 can cause the network device to operate according to a standby selectable operation policy, e.g., a selectable operation policy including shared definitions of network device operational parameters with a selectable operation policy and a factory default operation policy. Additionally or alternatively, in configuring a network device to operate in a standby mode in response to a received standby notification, the self-configuring network device operation management system 108 can modify performance triggers of selectable operation policies with which the network device is operating or capable of operating. For example, if a performance trigger for a selectable operation policy indicates to use the policy when a network device is providing network service access to one hundred clients, then the self-configuring network device operation management system 108 can modify the performance trigger for the policy to indicate using the policy when the network device is serving fifty clients.

In an example of operation of the example system shown in FIG. 1, the self-configuring network device operation coordination system 104 generates a selectable operation policy for the network devices 106. In the example of operation of the example system shown in FIG. 1, the self-configuring network device operation management system 108 configures the network devices 106 to operate according to the density-based operation policy based on density loads on the network devices 106 in providing network service access.

The following description and associated figures describe self-configuring network devices in association with, density-based network device operation and management systems. As such, self-configuring network device operation can be referred to as "density-based network device operation" or "self-configuring density-based network device operation" and the selectable operation policies can be referred to as "density-based operation policies" or "selectable density-based operation policies."

Figure 2:
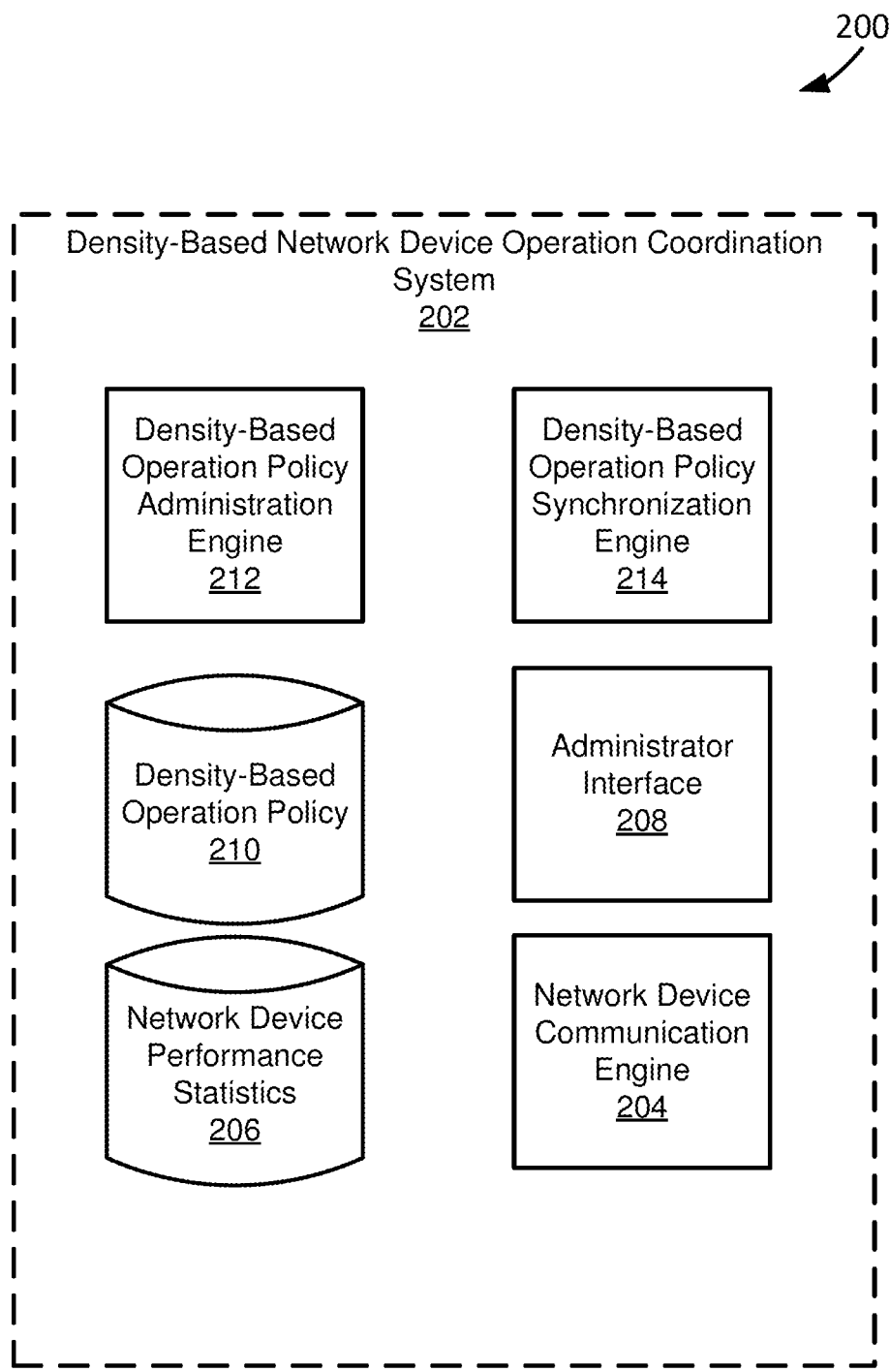
FIG. 2 depicts a diagram of an example density-based network device operation coordination system.

FIG. 2 depicts a diagram 200 of an example density-based network device operation coordination system 202. The density-based network device operation coordination system 202 is intended to represent a system that coordinates network devices to operate using density-based operation policies. In a specific implementation, the density-based network device operation coordination system 202 generates a density-based operation policy for use by network devices based on load densities of the network devices. Additionally, the density-based network device operation coordination system 202 can synchronize network devices to operate according to specific density-based operation policies. In synchronizing network devices to operate according to specific density-based operation policies, the density-based network device operation coordination system 202 can select specific network devices to operate according specific density-based operation policies and provide the specific density-based operation policies to the specific network devices. For example, the density-based network device operation coordination system 202 can select a network device within a group of network devices to operate according to a high density operation policy and subsequently provide the operation policy to the network device.

In a specific implementation, the density-based network device operation coordination system 202 functions to coordinate network devices to operate according to density-based operation policies based on administrator input. The density-based network device operation coordination system 202 can receive input from an administrator regarding network device operational parameters and subsequently create network device operation policies based on the input. For example, an administrator can input that a network device should turn off a 2.4 GHz radio when operating under a high load density and the density-based network device operation coordination system 202 can generate and/or update a high density operation policy to include the operational parameter of turning off the 2.4 GHz radio. Additionally, the density-based network device operation coordination system 202 can receive input from an administrator regarding a specific network device to configure to operate according to a specific density-based operation policy, and subsequently configure the network device to operate according to the specific density-based operation policy. For example, an administrator can input allowing a specific network device to operate according to a high density operation policy, and the density-based network device operation coordination system 202 can send the high density operation policy to the specific network device.

The example density-based network device operation coordination system 202 shown in FIG. 2 includes a network device communication engine 204, a network device performance statistics datastore 206, an administrator interface 208, a density-based operation policy datastore 210, a density-based operation policy administration engine 212, and a density-based operation policy synchronization engine 214. The network device communication engine 204 functions to send and receive data to and from network devices for purposes of coordinating the network devices to operate according to a density-based operation policies. The network device communication engine 204 can send density-based operation policy data to a network device for use by the network device to operate according to the density-based operation policy. For example, if a network administrator specifies to allow a network device to operate according to a high density operation policy, then the network device communication engine 204 can send the high density operation policy to the network device.

In a specific implementation, the network device communication engine 204 functions to receive network device performance statistics data from a network device. Performance statistics data received from a network device can include a number of client devices a network device serves in providing network service access. For example, the network device communication engine 204 can receive performance statistics including a number of client devices served by a network device over a twenty-four hour period measured every five minutes. Further in the example, the network device communication engine 204 can receive performance statistics including an average number of client devices a network device serves over a twenty-four hour time period and a ninety percent value of the average number of client devices served by the network device. Additionally, performance statistics data received from a network device can include additional performance parameters under which a network device operated, e.g. error rates of the network device in providing network service access.

The network device performance statistics datastore 206 functions to store network device performance statistics data indicating network device performance statistics of network devices. Network device performance statistics data stored in the network device performance statistics datastore 206 can be generated, at least in part, at a network device and subsequently received from the network device. For example, network device performance statistics data stored in the network device performance statistics datastore 206 can indicate an average number of client devices a network device provided network service access to over a twenty-four hour time period, as determined by the network device.

The administrator interface 208 functions as an interface through which an administrator can control coordination of network devices to operate according to density-based operation policies. Specifically, the administrator interface 208 functions to allow an administrator to provide input used in coordination of network devices to operate according to density-based operation policies. Using the administrator interface 208, an administrator can indicate network device operation parameters defined by density-based operation policies for purposes of creating or updating density-based operation policies. For example, using the administrator interface 208, an administrator can indicate to include a standby notification command in a high density operation policy. Additionally, using the administrator interface 208, an administrator can select specific network devices to synchronize with specific density-based operation policies for purposes of allowing the network devices to operate according to the density-based operation policies. For example, through the administrator interface 208, an administrator can select a network device within a group of network devices to load a high density operation policy onto thereby allowing the network device to operate according to the high density operation policy.

The density-based operation policy datastore 210 functions to store density-based operation policy data indicating density-based operation policies. Density-based operation policy data stored in the density-based operation policy datastore 210 can be used in synchronizing specific network devices to operate according to specific density-based operation policies. For example, as part of synchronizing network devices to operate according to density-based operation policies, density-based operation policy data stored in the density-based operation policy datastore 210 can be provided to the network devices. Density-based operation policy data stored in the density-based operation policy datastore 210 can include which specific network devices have been synchronized with specific density-based operation policies. For example, density-based operation policy data stored in the density-based operation policy datastore 210 can indicate a specific network device a high density operation policy has been provided to in allowing the network device to operate according to the high density operation policy.

The density-based operation policy administration engine 212 functions to maintain density-based operation policies. In maintaining density-based operation policies, the density-based operation policy administration engine 212 can generate and/or update density-based operation policies. The density-based operation policy administration engine 212 can maintain density-based operation policies according to performance statistics received from network devices. For example, if performance statistics indicate that network devices within a physical area experience increased load densities as client devices move through the area, then the density-based operation policy administration engine 212 can generate a high density operation policy including a standby notification command for the network devices. Additionally, the density-based operation policy administration engine 212 can maintain density-based operation policies according to administrator input. For example, if administrator input indicates a high density operation policy should include shutting off a 2.4 GHz radio, then the density-based operation policy administration engine 212 can generate a high density operation policy defining a network device operation parameter of shutting off a 2.4 GHz radio of network devices operating according to the policy.

In a specific implementation, the density-based operation policy administration engine 212 functions to generate and/or modify density-based performance triggers for operation policies as part of maintaining density-based operation policies. The density-based operation policy administration engine 212 can generate and/or modify density-based performance triggers based on performance statistics received from network devices. For example, the density-based operation policy administration engine 212 can set a density-based performance trigger for a high density operation policy as the number of client devices accessing network services is twenty percent greater than the a ninety percent value of the average number of client devices served by a network device over a twenty-four time period, as indicated by performance statistics of the network device. Additionally, the density-based operation policy administration engine 212 can generate and/or modify density-based performance triggers based on administrator input. For example, if administrator input indicates to stop operation of a network device according to a high density operation policy when a number of clients served by the network device drops below a threshold value, then the density-based operation policy administration engine 212 can generate a density-based performance trigger including the threshold value for the high density operation policy.

The density-based operation policy synchronization engine 214 functions to synchronize network devices to operate according to density-based operation policies. In synchronizing network devices to operate according to density-based operation policies, the density-based operation policy synchronization engine 214 can select specific network devices to operate according to specific density-based operation policies. For example, the density-based operation policy synchronization engine 214 can select a network device within a group of network devices to configure to operate according to high density operation policy. Additionally, in synchronizing network devices to operate according to density-based operation policies, the density-based operation policy synchronization engine 214 can instruct an applicable engine for communicating with a network device, such as the network device communication engines described in this paper, to send density-based operation policy data to a network device for use in configuring the network device to operate according to a density-based operation policy.

In synchronizing a network device to operation according to a density-based operation policy, the density-based operation policy synchronization engine 214 functions to synchronize the network device to selectively operate according to the density-based operation policy and another operation policy. Specifically, the network device can select which policy to operate according to in providing network service access, for example, based on a load density on the network device, as indicated by operational performance of the network device. For example, In a specific implementation, the density-based operation policy synchronization engine 214 functions to synchronize network devices to operate according to density-based operation policies using administrator input. For example, if administrator input specifies configuring a specific network device to operate using a high density operation policy, then the density-based operation policy synchronization engine 214 can instruct an applicable engine for communicating with the network device, such as the network device communication engines described in this paper, to send density-based operation policy data of the high density operation policy to the network device. In another example, if administrator input specifies configuring a specific network device to operate using a low density operation policy, then the density-based operation policy synchronization engine 214 can instruct an applicable engine for communicating with the network device, such as the network device communication engines described in this paper, to send density-based operation policy data of the low density operation policy to the network device.

In a specific implementation, the density-based operation policy synchronization engine 214 functions to synchronize network devices to operate according to density-based operation policies using network device performance statistics. For example, if network device performance statistics indicate a network device is experiencing error rates in providing network service access above a threshold amount of errors, then the density-based operation policy synchronization engine 214 can instruct an applicable engine for communicating with the network device, such as the network device communication engines described in this paper, to send density-based operation policy data of a high density operation policy to the network device. In another example, if network device performance statistics indicate a network device provides a number of client devices above a threshold number of client devices network service access, then the density-based operation policy synchronization engine 214 can instruct an applicable engine for communicating with the network device, such as the network device communication engines described in this paper, to send density-based operation policy data of a high density operation policy to the network device.

In an example of operation of the example system shown in FIG. 2, the network device communication engine 204 receives performance statistics data from network devices indicating operation performance of the network devices in providing network service access. In the example of operation of the example system shown in FIG. 2, the network device communication engine 204 stores the performance statistics data in the network device performance statistics datastore 206. Further, in the example of operation of the example system shown in FIG. 2, an administrator provides, through the administrator interface 208, administrator input regarding coordination of the network devices to operate according to density-based operation policies. In the example of operation of the example system shown in FIG. 2, the density-based operation policy administration engine 212 maintains density-based operation policies according to the performance statistics of the network devices and the administrator input. Additionally, in the example of operation of the example system shown in FIG. 2, the density-based operation policy datastore 210 stores density-based operation policy data indicating the density-based operation policies maintained by the density-based operation policy administration engine 212. In the example of operation of the example system shown in FIG. 2, the density-based operation policy synchronization engine 214 synchronizes the network devices to operate according to the density-based operation policies using, at least in part, the network device communication engine 204.

Figure 3:
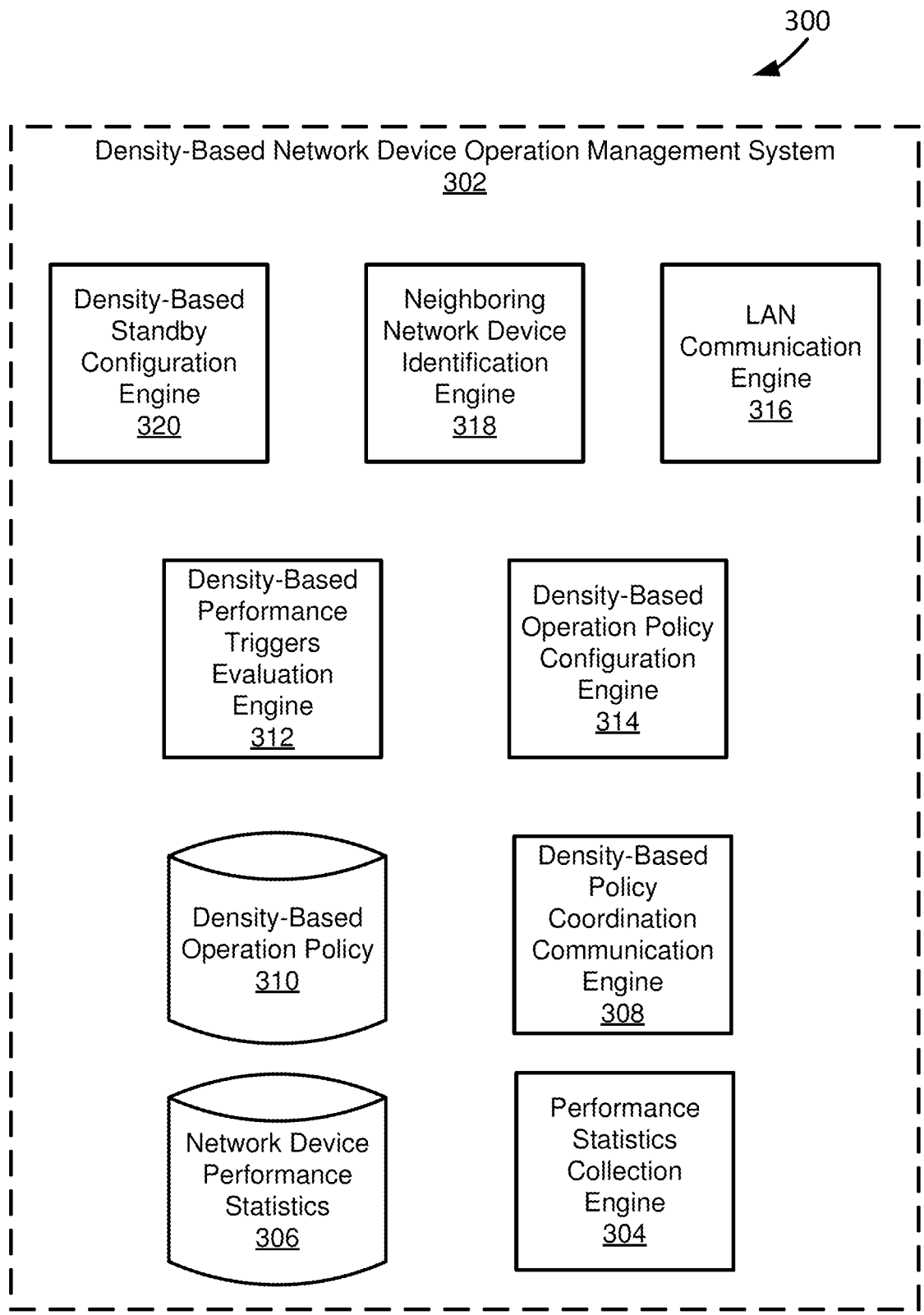
FIG. 3 depicts a diagram of an example density-based network device operation management system.

FIG. 3 depicts a diagram 300 of an example density-based network device operation management system 302. Functionalities of the density-based network device operation management system 302 can be performed on a single network device or distributed across a plurality of network devices. The density-based network device operation management system 302 functions according to an applicable system for configuring a network device to operate according to a density-based operation policy, such as the density-based network device operation management systems described in this paper. In configuring a network device to operate according to a density-based operation policy, the density-based network device operation management system 302 can control operation of a network device according to a density-based operation policy. For example, the density-based network device operation management system 302 can control a network device to switch between operating according to a high density operation policy and a factory default operation policy or a low load density operation policy.

The example density-based network device operation management system 302 shown in FIG. 3 includes a performance statistics collection engine 304, a network device performance statistics datastore 306, a density-based policy coordination communication engine 308, a density-based operation policy datastore 310, a density-based performance triggers evaluation engine 312, a density-based operation policy configuration engine 314, a LAN communication engine 316, a neighboring network device identification engine 318, and a density-based standby configuration engine 320. The performance statistics collection engine 304 functions to collect performance statistics of operation of a network device. The performance statistics collection engine 304 can locally collect at a network device performance statistics of operation of the network device. In collecting performance statistics, the performance statistics collection engine 304 can maintain network device performance statistics data indicating the collected performance statistics.

In a specific implementation, the performance statistics collection engine 304 functions to collect performance statistics for a network device according to a schedule. For example, the performance statistics collection engine 304 can collect performance statistics for a network device every five minutes in a span of twenty-four hours. Further in the example, the performance statistics collection engine 304 can determine a number of clients provided network service access by the network device at each five minute interval. Additionally in the example, the performance statistics collection engine 304 can determine an average number of clients and a ninety percent value of the average number of clients served by the network device based on the measurements taken at each five minute interval.

The network device performance statistics datastore 306 functions to store network device performance statistics data indicating network device performance statistics of network devices within a LAN. The network device performance statistics datastore 306 can be implemented at one or a plurality of network devices within a LAN and configured to store network device performance statistics data gathered/generated locally within the LAN. Additionally, the network device performance statistics datastore 306 can store network device performance statistics data which can be erased at pre-set times. For example, network device performance statistics data stored in the network device performance statistics datastore 306 can be erased every twenty-four hours and/or after it is provided for use in coordinating network devices to operate according to density-based operation policies.

The density-based policy coordination communication engine 308 functions to send and receive data used in coordinating a network device to operate according to a density-based operation policy. In sending and receiving data for use in coordinating network devices to operate according to a density-based operation policy, the density-based policy coordination communication engine 308 can communicate with an applicable system for coordinating network devices to operate according to density-based operation policies, such as the density-based network device operation coordination systems described in this paper. The density-based policy coordination communication engine 308 can send network device performance statistics for use in coordinating a network device to operate according to a density-based operation policy. Additionally, the density-based policy coordination communication engine 308 can receive density-based operation policy data for use in configuring a network device to operate according to a density-based operation policy. For example, the density-based policy coordination communication engine 308 can receive density-based operation policy data for a high density operation policy and store the data locally for use in configuring a network device to operate according to the policy.

The density-based operation policy datastore 310 functions to store density-based operation policy data for use in configuring a network device to operate according to density-based operation policies. Density-based operation policy data stored in the density-based operation policy datastore 310 can be received from an applicable system for coordinating network devices to operate according to density-based operation policies, such as the density-based network device operation coordination systems described in this paper. The density-based operation policy datastore 310 can be implemented locally at a network device or at a local location accessible to the network device through a LAN.

The density-based performance triggers evaluation engine 312 functions to determine if density-based performance triggers have been met. Specifically, the density-based performance triggers evaluation engine 312 determines if density-based performance triggers have been met for purposes of configuring network devices to operate, prepare to operate, or stop operating according to density-based operation policies associated with the triggers. The density-based performance triggers evaluation engine 312 can determine if density-based performance triggers have been met based on operational performance, e.g. performance parameters, of a network device. For example, if a density-based performance trigger for a high density operation policy is a network device providing network service access to a number of clients ten percent above its average number of client served, the density-based performance triggers evaluation engine 312 can determine if the network device is serving a number of clients ten percent above its average number of served clients to determine whether the trigger has been met. In another example, if a density-based performance trigger for stopping operation according to a high density operation policy is a number of clients served by a network device is ten percent below the average number of client served by the device, the density-based performance triggers evaluation engine 312 can determine if the network device is serving a number of clients ten percent below its average number of served clients to determine whether the trigger has been met.

The density-based operation policy configuration engine 314 functions to configure a network device to operate, prepare to operate, or stop operating according to a policy in providing network service access. The density-based operation policy configuration engine 314 can configure a network device to operate, prepare to operate, or stop operating according to density-based operation policies. In configuring a network device to operate, prepare to operate, or stop operating according to a policy in providing network service access, the density-based operation policy configuration engine 314 can control systems and/or hardware within the network device according to the policy. For example, the density-based operation policy configuration engine 314 can cause a network device to stop performing wireless intrusion prevention. In another example, the density-based operation policy configuration engine 314 can instruct an applicable engine for communicating with neighboring network devices to instruct a neighboring network device to accept a handoff of a client and provide network service access to the client, e.g. handle traffic transmitted to and from the client in accessing network services. In yet another example, the density-based operation policy configuration engine 314 can instruct an applicable engine for communicating with neighboring network devices to send standby notifications to the neighboring network devices.

In a specific implementation, the density-based operation policy configuration engine 314 functions to configure a network device to operate, prepare to operate, or stop operating according to different policies. In configuring a network device to operate, prepare to operate, or stop operating according to different policies, the density-based operation policy configuration engine 314 provides the network device the ability to selectively operate according to the different policies in providing network service access. For example, the density-based operation policy configuration engine 314 can configure the network device to switch to operating from a factory default policy to a high density operation policy.

In a specific implementation, the density-based operation policy configuration engine 314 can configure a network device to operate, prepare to operate, or stop operating according to a density-based operation policy based on whether density-based performance triggers associated with the policy have been met. For example, if, during operation of a network device, a density-based performance trigger signifying to begin using a high density operation policy is met, then the density-based operation policy configuration engine 314 can dynamically configure the network device to being operating according to the high density operation policy. In another example, if, during operation of a network device, a density-based performance trigger signifying to stop using a high density operation policy and revert back to using a previously used operation policy is met, then the density-based operation policy configuration engine 314 can dynamically configure the network device to stop operating according to the high density operation policy and begin operating according to the previously used operation policy.

The LAN communication engine 316 functions to communicate with other network devices within a LAN. The LAN communication engine 316 can communicate with other network devices according to an applicable protocol, such as AMRP. The LAN communication engine 316 can communicate using a LAN network back-end or through wireless connections directly connecting network devices together, e.g. as part of a mesh network. Additionally, the LAN communication engine can communicate using, at least in part, a WAN.

In a specific implementation, the LAN communication engine 316 functions to communicate with neighboring network devices for purposes of providing standby functionalities within a network. In providing standby functionalities, the LAN communication engine 316 can send standby notifications to neighboring network devices. For example, if a high density operation policy specifies sending standby notifications to neighboring network devices, and a network device begins operating according to the high density operation policy, then the LAN communication engine 316 can send standby notifications to the neighboring network devices. Further, in providing standby functionalities, the LAN communication engine 316 can receive standby notifications from neighboring network devices.

The neighboring network device identification engine 318 functions to determine neighboring network devices of a network device. The neighboring network device identification engine 318 can use an applicable method and/or systems to determine neighboring network devices. The neighboring network device identification engine 318 can use ACSP to determine neighboring network devices. Additionally, the neighboring network device identification engine 318 can determine if network devices are neighboring network devices based on signal strengths of signals received from the network devices. For example, if a strength of a signal received from a network device falls below a threshold value, e.g. −70 dbM or a specific RSSI value, then the neighboring network device identification engine 318 can determine the network device is not a neighboring network device.

The density-based standby configuration engine 320 functions to configure the network device to operate in a standby density-based mode in response to a standby notification received from a neighboring network device. In configuring a network device to operate in a standby density-based mode, the density-based standby configuration engine 320 can cause the network device to operate according to a standby density-based operation policy, e.g. an operation policy including shared definitions of network device operational parameters with a high density operation policy and a factory default operation policy. For example, the density-based standby configuration engine 320 can instruct an applicable engine for configuring a network to operate according to a density-based operation policy, such as the density-based operation policy configuration engines described in this paper, to configure the network device to operate in a standby density-based mode.

In a specific implementation, in configuring a network device to operate in a standby density-based mode, the density-based standby configuration engine 320 can modify density-based performance triggers of density-based operation policies. For example, if a density-based performance trigger for a high density operation policy indicates to use the policy when a network device is providing network service access to one hundred clients, then the density-based standby configuration engine 320 can modify the density-based performance trigger for the policy to indicate using the policy when the network device is serving fifty clients. In another example, if a density-based performance trigger for a high density operation policy is serving a number of client devices ten percent greater than the twenty four hour average number of client devices served, then the density-based standby configuration engine 320 can modify the density-based performance trigger for the high density operation policy to indicate serving a number of client devices at least twenty percent greater than the total client devices served at a previous measuring time, e.g. after a 5 minute polling cycle.

In a specific implementation, in modifying density-based performance triggers of density based operation policies as part of configuring a network device to operate in a standby density-based mode, the density-based standby configuration engine 320 can set time limits on an amount of time a modified density-based performance trigger remains valid, e.g. a trigger validity time. For example, in modifying a density-based performance trigger of a policy to create a modified density-based performance trigger, the density-based standby configuration engine 320 can set a trigger validity time of five minutes for the modified density-based performance trigger. Further in the example, if the modified density-based performance trigger is not met within five minutes to trigger configuration according to the policy, then the modified trigger expires and the original density-based performance trigger is used to trigger configuration according to the policy.

In an example of operation of the example system shown in FIG. 3, the performance statistics collection engine 304 locally collects network device performance statistics of a network device in operation. In the example of operation of the example system shown in FIG. 3, the network device performance statistics datastore 306 stores network device performance statistics data indicating the network device performance statistics collected by the performance statistics collection engine 304. Further, in the example of operation of the example system shown in FIG. 3, the density-based policy coordination communication engine 308 provides the network device performance statistics data stored in the network device performance statistics datastore 306 to an applicable system for coordinating network devices to operate according to density-based operation policies, such as the density-based network device operation coordination systems described in this paper.

In the example of operation of the example system shown in FIG. 3, the density-based policy coordination communication engine 308 receives density-based operation policy data of a density-based operation policy from an applicable system for coordinating network devices to operate according to density-based operation policies, such as the density-based network device operation coordination systems described in this paper. Further, in the example of operation of the example system shown in FIG. 3, the density-based policy coordination communication engine 308 stores the received density-based operation policy data in the density-based operation policy datastore 310. In the example of operation of the example system shown in FIG. 3, the density-based performance triggers evaluation engine 312 monitors operation performance of the network device to determine if a density-based performance trigger for the density-based operation policy, as indicated by the density-based operation policy data stored in the density-based operation policy datastore 310, has been met. Additionally, in the example of operation of the example system shown in FIG. 3, the density-based operation policy configuration engine 314 configures the network device to operate according to the density-based operation policy, using the density-based operation policy data stored in the density-based operation policy datastore 310, if the density-based performance triggers evaluation engine 312 determines the trigger has been met.

Figure 4:
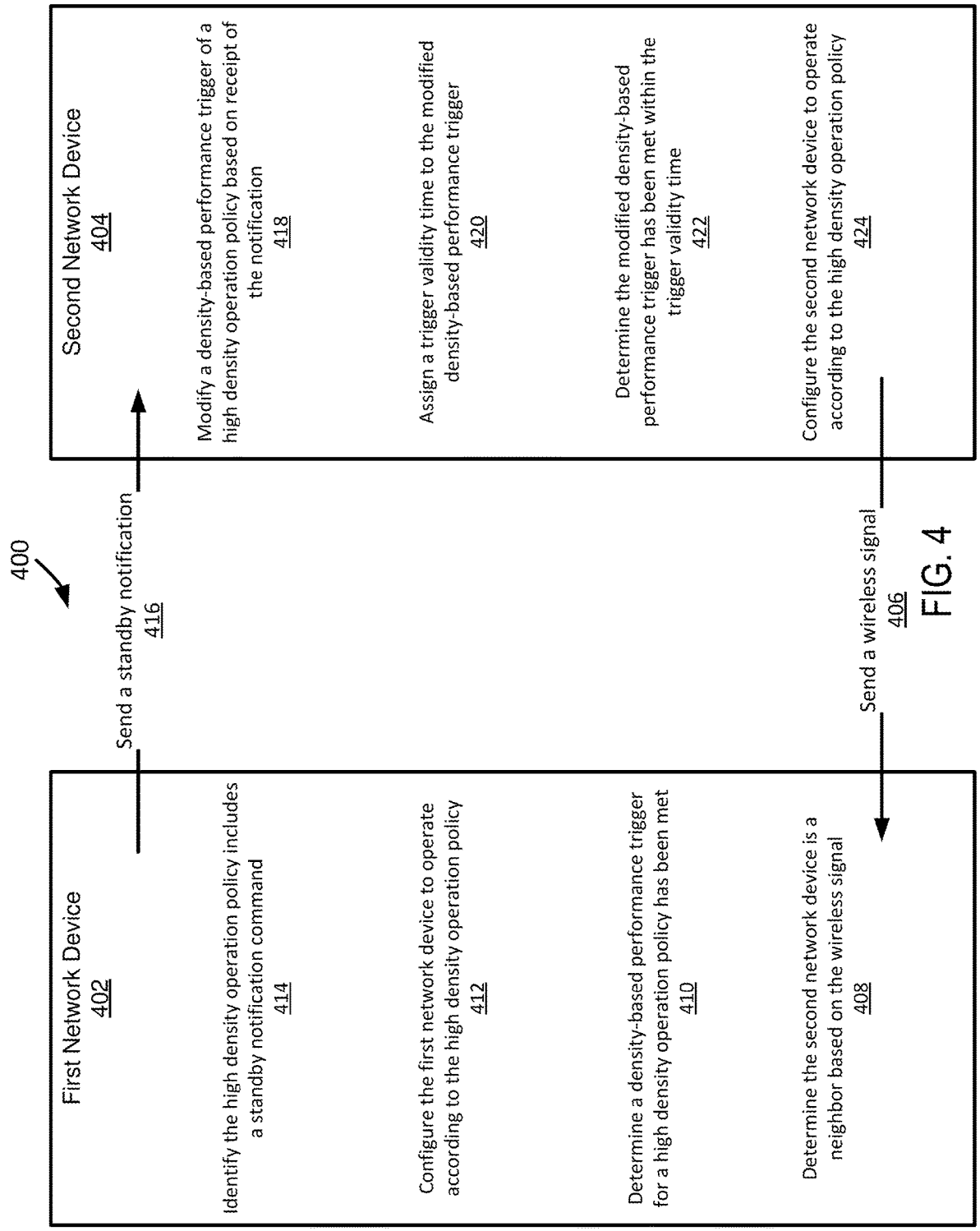
FIG. 4 depicts a diagram of an example of a system for configuring network devices to operate in a standby density-based mode in providing network service access.

FIG. 4 depicts a diagram 400 of an example of a system for configuring network devices to operate in a standby density-based mode in providing network service access. The example system shown in FIG. 4 includes a first network device 402 and a second network device 404. The first network device 402 and the second network device 404 can function according to applicable devices for providing network service access, such as the network devices described in this paper. The first and second network devices 402 and 404 can include an applicable system for managing network device operation according to density-based operation policies, such as the density-based network device operation management systems described in this paper.

In the example system shown in FIG. 4, the second network device 404 functions to send a wireless signal at 406 to the first network device 402. An applicable engine for communicating within a LAN, such as the LAN communication engines described in this paper can send and receive a wireless signal at 406. The wireless signal can be sent at 406 as part of an ACSP.

At 408, it is determined whether the second network device 404 is a neighboring network device of the first network device 402 based on the wireless signal sent at 406. An applicable engine for determining neighboring network devices, such as the neighboring network device identification engines described in this paper, can determine, at 408, whether the second network device 404 is a neighboring network device to the first network device 402 based on the signal sent at 406. A received signal strength of the wireless signal can be used to determine whether the second network device 404 is a neighboring network device to the first network device 402. For example if a received signal strength of the wireless signal sent at 406 is above a threshold value, e.g. −70 dbM or a specific RSSI value, then it can be determined the second network device 404 is a neighboring network device to the first network device 402. For purposes of continues discussion of the system shown in FIG. 4, the second network device 404 is a neighboring network device of the first network device 402.

At 410, it is determined, at the first network device 402, whether a density-based performance trigger for a high density operation policy has been met. An applicable engine for determining whether a density-based performance trigger has been met, such as the density-based performance trigger evaluation engines described in this paper, can determine, at 410, whether a density-based performance trigger for a high density operation policy has been met. Density-based operation policy data for a high density operation policy can be loaded onto the first network device 402, as part of synchronization of network devices to operate according to density-based operation policies. Further, the density-based operation policy data can be used to locally determine at the first network device 402 whether the density-based performance trigger for the high density operation policy, as indicated by the density-based operation policy data, based on operational performance of the first network device 402 in providing network service access.

At 412, the first network device 402 is configured to operate according to the high density operation policy in response to a determination, made at 410, that the density-based performance trigger has been met. An applicable engine for configuring network devices to operate according to density-based operation policies, such as the density-based operation policy configuration engines described in this paper, can configure the first network device 402 to operate according to the high density operation policy at 412. The first network device 402 can be previously synchronized to operate according to the high density-based operation policy, thereby allowing it to configure itself to operate according to the high density operation policy at 412. In configuring the first network device 402 to operate according to the high density operation policy, the first network device 402 dynamically switches from operating according to a first operation policy, e.g. a factory default operation policy, to the high density operation policy in response to a load density on the first network device 402 in providing network service access.

At 414, it is identified that the high density operation policy includes a standby notification command. An applicable engine for configuring network devices to operate according to density-based operation policies, such as the density-based operation policy configuration engines described in this paper, can identify that the high density operation policy includes a standby notification command. The density-based operation policy for the high density operation policy residing locally at the first network device 402 can include a standby notification command, thereby signifying the high density operation policy includes the standby notification command.

At 416, a standby notification is sent from the first network device 402 to the second network device 404. An applicable engine for configuring network device to operate according to density-based operation policies, such as the density-based operation policy configuration engines described in this paper, can instruct an applicable engine for communicating with other network devices, such as the LAN communication engines described in this paper, to send a standby notification at 416. A standby notification can be sent at 416 through an applicable communication channel or channels, such as a LAN back-end or a wireless connection directly connecting the first network device 402 and the second network device 404.

At 418, a density-based performance trigger of a high density operation policy is modified, at the second network device 404, in response to receipt of the standby notification sent at 416. An applicable engine for modifying density-based performance triggers based on receipt of a standby notification, such as the density-based standby configuration engines described in this paper, can modify a density-based performance trigger of a high density operation policy, at the second network device 404, in response to receipt of the standby notification sent at 416. A high density operation policy at the second network device 404 can be the same high density operation policy the first network device 402 is configured to operate according to at 412, or a different high density operation policy. Density-based operation policy data for a high density operation policy can be loaded onto the second network device 404, as part of synchronization of network devices to operate according to density-based operation policies, and subsequently be used to modify a density-based performance trigger for the high density operation policy. In modifying a density-based performance trigger of a high density operation policy, at 418, the second network device 404 is configured to operate in a standby density-based mode.

At 420, a trigger validity time is assigned to the modified density-based performance trigger. An applicable engine for modifying density-based performance triggers based on receipt of a standby notification, such as the density-based standby configuration engines described in this paper, can assign a trigger validity time to the modified density-based performance trigger. In assigning a trigger validity time to a modified density-based performance trigger of the high density operation policy, at 420, the second network device 404 is configured to operate in a standby density-based mode.

At 422, it is determined that the modified density-based performance trigger has been met within the trigger validity time. An applicable engine for determining whether a density-based performance trigger has been met, such as the density-based performance trigger evaluation engines described in this paper, can determine, at 422, that the modified density-based performance trigger has been met within the trigger validity time. The density-based operation policy data loaded onto the second network device 404, as part of synchronization of network devices, can be used to locally determine at the second network device 404 that the modified density-based performance trigger has been met.

At 424, the second network device 404 is configured to operate according to the high density operation policy based on satisfaction of the modified density-based performance trigger. An applicable engine for configuring a network device to operate according to a density-based operation policy, such as the density-based operation policy configuration engines described in this paper, can configure the second network device 404 to operate according to the high density operation policy. The second network device 404 can be previously synchronized to operate according to the high density-based operation policy, thereby allowing it to configure itself to operate according to the high density operation policy at 424. In configuring the second network device 404 to operate according to the high density operation policy, the second network device 404 dynamically switches from operating in a standby density-based mode according to a first operation policy, e.g. a factory default operation policy, to the high density operation policy in response to a load density on the second network device 404 in providing network service access.

Figure 5:
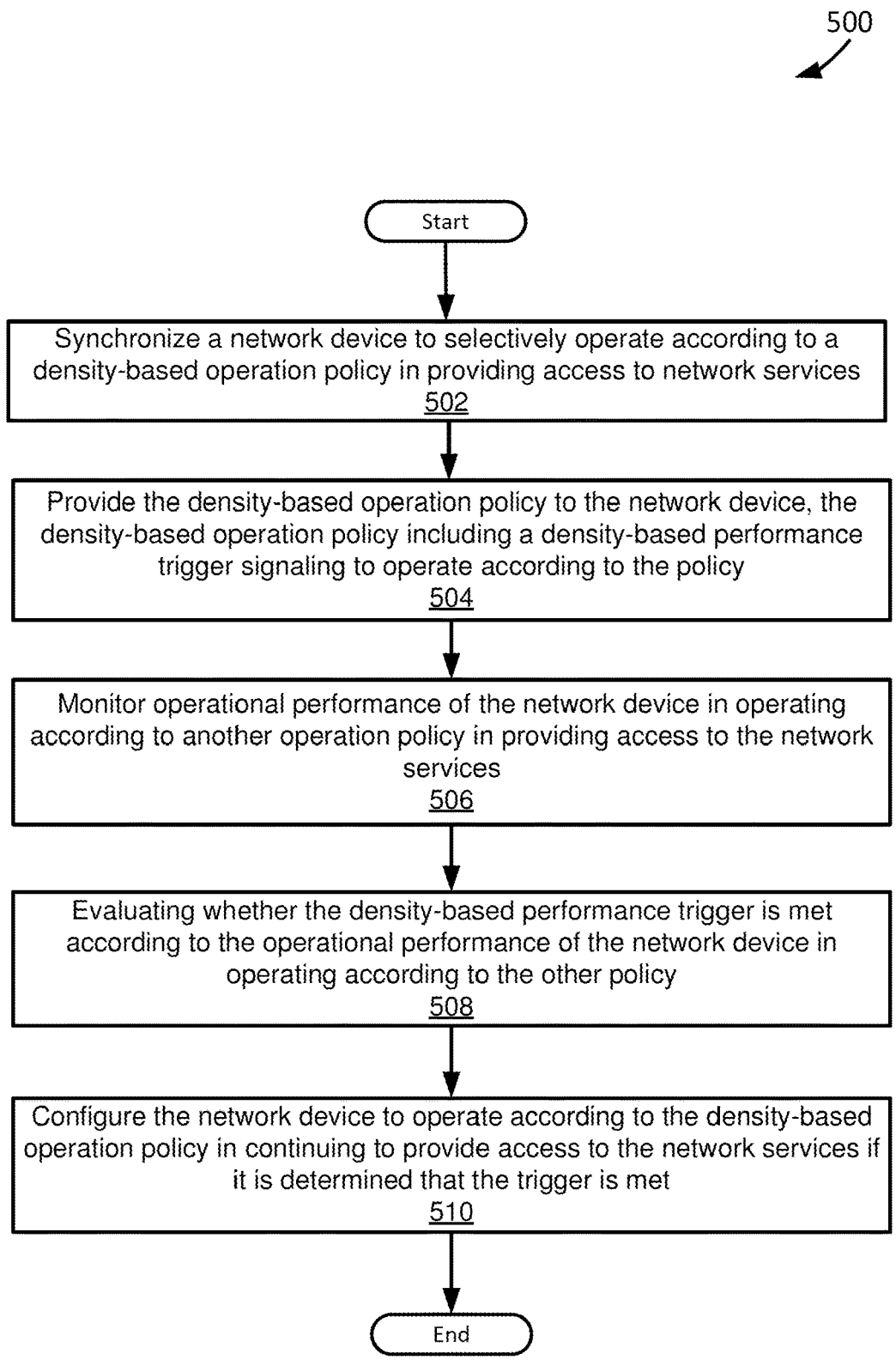
FIG. 5 depicts a flowchart of an example of method for configuring a network device to selectively operate according to a density-based operation policy in providing access to network services.

FIG. 5 depicts a flowchart 500 of an example of method for configuring a network device to selectively operate according to a density-based operation policy in providing access to network services. The flowchart 500 begins at module 502, where a network device is synchronized a network device to selectively operate according to a density-based operation policy in providing access to network services. An applicable engine for synchronizing network devices to operate according to a density-based operation policy, such as the density-based operation policy synchronization engines described in this paper, can synchronize a network device to operate according to a density-based policy in providing access to network services. A network device can be synchronized to selectively operate according to a density-based operation policy based on one or a combination of administrator input and performance statistics of a network device in providing network service access.

The flowchart 500 continues to module 504, where the density-based operation policy is provided to the network device. The density-based operation policy can be provided to the network device as part of synchronizing the network device to selectively operate according to the density-based operation policy. The density-based operation policy includes a density-based performance trigger signaling to operate according to the policy. An applicable engine for communicating with a network device, such as the network device communication engines described in this paper, can provide the density-operation policy to the network device. Additionally, an applicable engine for managing synchronization of network devices to operate according to policies, such as the density-based operation policy synchronization engines described in this paper, can instruct an applicable engine for communicating with a network device to actually send the density-based operation policy to the network device, as part of density-based operation policy data.

The flowchart 500 continues to module 506, where operational performance of the network device in operating according to another operation policy in providing access to network services is monitored. An applicable engine for monitoring operation performance of a network device in providing network service access, such as the density-based performance triggers evaluation engines described in this paper, can monitor operational performance of the network device in operating according to another operation policy in providing access to network services. Another operation policy can include a factory default policy or another density-based operation policy, the network device was previously synchronized with to use in operating to provide network service access. In monitoring operation performance, performance parameters of the network device in operating to provide network service access can be determined.

The flowchart 500 continues to module 508, where it is evaluated whether the density-based performance trigger is met according to the operational performance of the network device in operating according to the other policy. An applicable engine for determining whether a density-based performance trigger has been met, such as the density-based performance trigger evaluation engines described in this paper, can determine whether the density-based performance trigger has been met according to the operational performance of the network device in operating according to the other policy. For example, if a density-based performance trigger for the density-based operation policy is a network device providing network service access to a number of clients ten percent above its average number of client served, then it can be determined that the trigger is met if the network device is serving a number of clients ten percent above its average number of served clients.

The flowchart 500 continues to module 510 where the network device is configured to operate according to the density-based operation policy in continuing to provide access to the network service if it is determined that the trigger is met. An applicable engine for configuring a network device to operate according to a density-based operation policy, such as the density-based operation policy configuration engines described in this paper, can configure the network device to operate according to the density-based operation policy in continuing to provide access to the network services if it is determined that the trigger is met. In configuring the network device to operate according to the density-based operation policy hardware elements and/or systems of the network device can be controlled according to the density-based operation policy as it is continuing to provide access to the network services.

Figure 6:
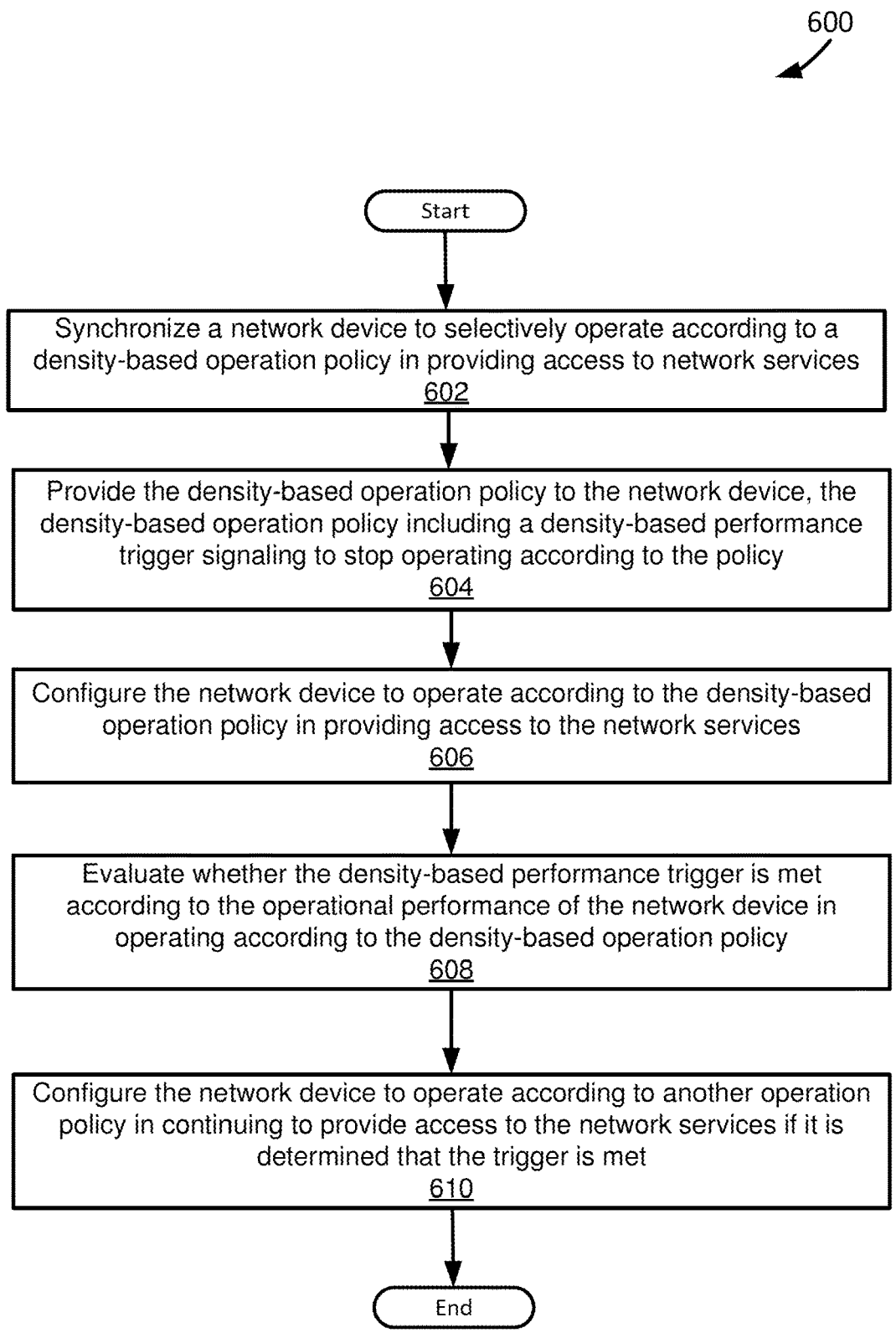
FIG. 6 depicts a flowchart of an example of a method for managing a network device in selectively switching operation according to different profiles.

FIG. 6 depicts a flowchart 600 of an example of a method for managing a network device in selectively switching operation according to different profiles. The flowchart 600 begins at module 602, where a network device is synchronized to selectively operate according to a density-based operation policy in providing access to network services. An applicable engine for synchronizing network devices to operate according to a density-based operation policy, such as the density-based operation policy synchronization engines described in this paper, can synchronize a network device to operate according to a density-based policy in providing access to network services. A network device can be synchronized to selectively operate according to a density-based operation policy based on one or a combination of administrator input and performance statistics of a network device in providing network service access.

The flowchart 600 continues to module 604, where the density-based operation policy is provided to the network device. The density-based operation policy can be provided to the network device as part of synchronizing the network device to selectively operate according to the density-based operation policy. The density-based operation policy includes a density-based performance trigger signaling to stop operating according to the policy. An applicable engine for communicating with a network device, such as the network device communication engines described in this paper, can provide the density-operation policy to the network device. Additionally, an applicable engine for managing synchronization of network devices to operate according to policies, such as the density-based operation policy synchronization engines described in this paper, can instruct an applicable engine for communicating with a network device to actually send the density-based operation policy to the network device, as part of density-based operation policy data.

The flowchart 600 continues to module 606, where the network device is configured to operate according to the density-based operation policy in providing access to the network services. An applicable engine for configuring a network device to operate according to a density-based operation policy, such as the density-based operation policy configuration engines described in this paper, can configure the network device to operate according to the density-based operation policy in providing access to the network services. In configuring the network device to operate according to the density-based operation policy hardware elements and/or systems of the network device can be controlled according to the density-based operation policy as it is continuing to provide access to the network services. The network device can be configured to operate according to the density-based operation policy if a density-based performance trigger of the policy signaling to start operating according to the policy is actually met.

The flowchart 600 continues to module 608, where whether the density-based performance trigger signaling to stop operating according to the policy is met. Whether the density-based performance trigger is met is determined based on operational performance of the network device in operating according to the density-based operation policy. An applicable engine for determining whether a density-based performance trigger has been met, such as the density-based performance trigger evaluation engines described in this paper, can determine whether the density-based performance trigger has been met according to the operational performance of the network device in operating according to the density-based operation policy. For example, if a density-based performance trigger signaling to stop operating according to the density-based operation policy is a network device providing network service access to a number of clients ten percent below its average number of client served, then it can be determined that the trigger is met if the network device is serving a number of clients ten percent below its average number of served clients.

The flowchart 600 continues to module 610, where the network device is configured to operate according to another operation policy in continuing to provide access to the network services if it is determined that the trigger is met. An applicable engine for configuring a network device to operate according to another operation policy, such as the density-based operation policy configuration engines described in this paper, can configure the network device to operate according to another operation policy in continuing to provide access to the network services if it is determined that the trigger is met. In configuring the network device to operate according to another operation policy hardware elements and/or systems of the network device can be controlled according to the density-based operation policy as it is continuing to provide access to the network services. Another operation policy can include a factory default policy or another density-based operation policy, the network device was previously synchronized with to use in operating to provide network service access.

Figure 7:
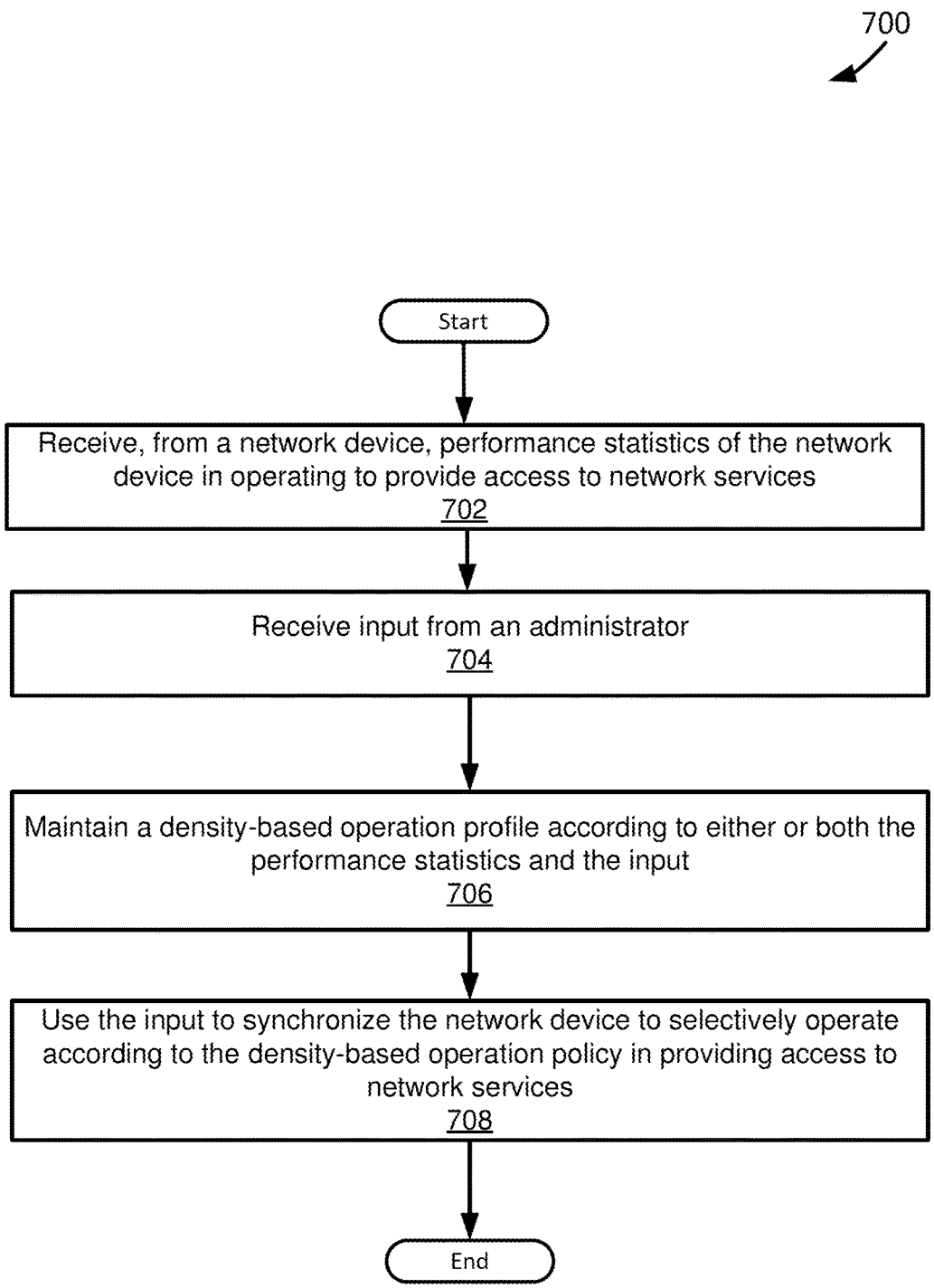
FIG. 7 depicts a flowchart of an example of a method for synchronizing a network device to operate according to a density-based operation policy.

FIG. 7 depicts a flowchart 700 of an example of a method for synchronizing a network device to operate according to a density-based operation policy. The flowchart 700 begins at module 702, where performance statistics of a network device in operating to provide access to network services are received from the network device. An applicable engine for collecting performance statistics of a network device, such as the performance statistics collection engines described in this paper, can collect performance statistics of a network device in providing access to network services. Performance statistics of a network device can be received by an applicable engine for communicating with a network device, such as the network device communication engines described in this paper.

The flowchart 700 continues to module 704, where input is received from an administrator. Input from an administrator can be received by an applicable interface used to communicate with an administrator, such as the administrator interfaces described in this paper. Input received from an administrator can indicate network device operation parameters defined by density-based operation policies for purposes of creating or updating density-based operation policies. Additionally, input received from an administrator can indicate specific network devices to synchronize with specific density-based operation policies for purposes of allowing the network devices to operate according to the density-based operation policies.

The flowchart 700 continues to module 706, where a density-based operation profile is maintained according to either or both the performance statistics and the input. An applicable engine for maintain a density-based operation policy, such as the density-based operation policy administration engines described in this paper, can maintain a density-based operation policy according to either or both the performance statistics and the input. For example, the performance statistics can be used to generate a density-based performance trigger for a density-based operation policy.

The flowchart 700 continues to module 708, where the input is used to synchronize the network device to selectively operate according to the density-based operation policy in providing access to network services. An applicable engine for synchronizing network devices to operate according to a density-based operation policy, such as the density-based operation policy synchronization engines described in this paper, can synchronize the network device to operate according to the density-based operation policy in providing access to network services using the input received from an administrator. As part of synchronizing the network device, the density-based operation policy can be provided to the network device.

Figure 8:
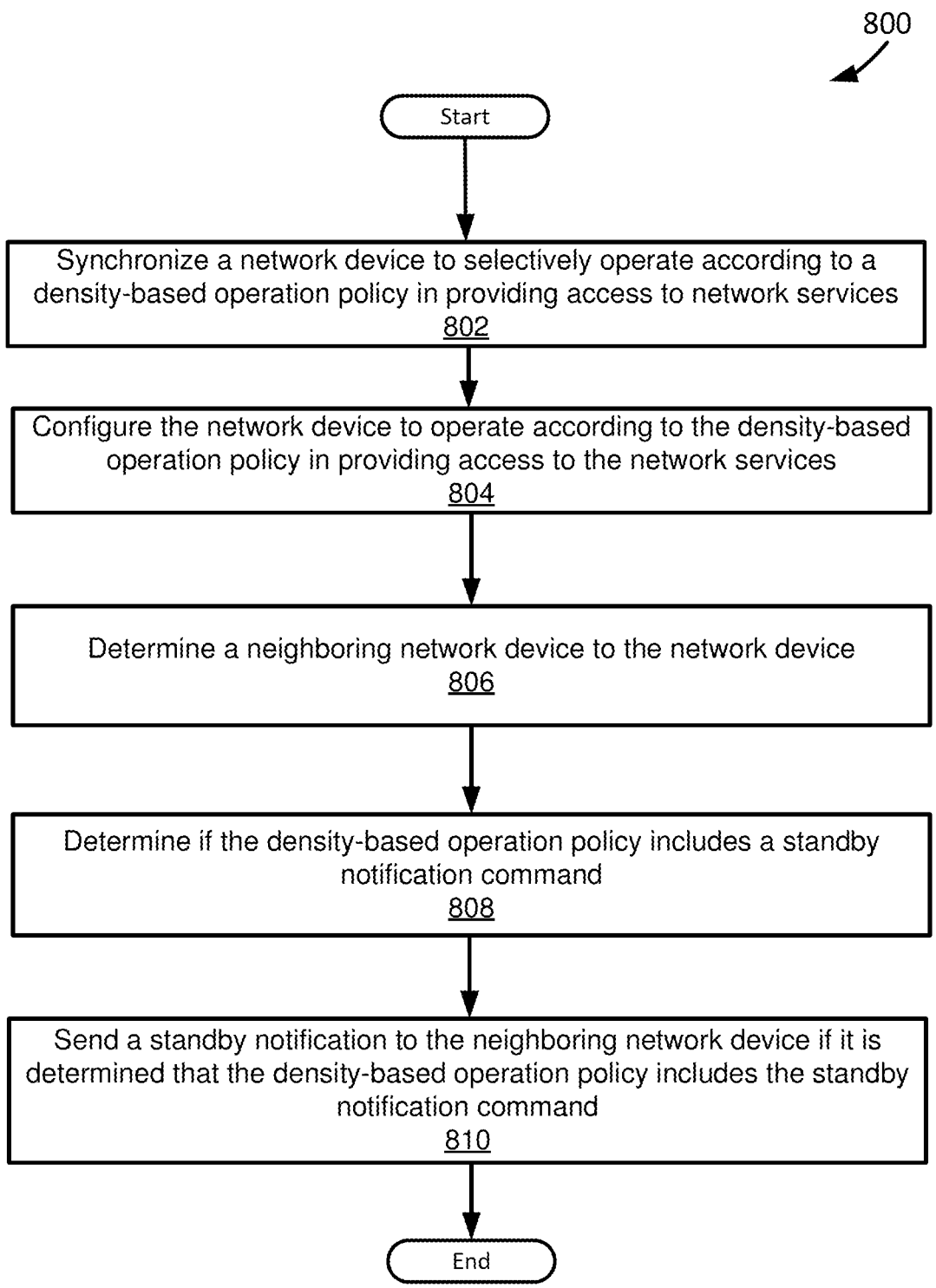
FIG. 8 depicts a flowchart of an example of a method for sending standby notifications to neighboring network devices in operating according to a density-based operation policy.

FIG. 8 depicts a flowchart 800 of an example of a method for sending standby notifications to neighboring network devices in operating according to a density-based operation policy. The flowchart 800 begins at module 802, where a network device is synchronized to selectively operate according to a density-based operation policy in providing access to network services. An applicable engine for synchronizing network devices to operate according to a density-based operation policy, such as the density-based operation policy synchronization engines described in this paper, can synchronize a network device to operate according to the density-based operation policy in providing access to network services. As part of synchronizing a network device, a density-based operation policy can be provided to the network device.

The flowchart 800 continues to module 804, where the network device is configured to operate according to the density-based operation policy in providing access to the network services. An applicable engine for configuring a network device to operate according to a density-based operation policy, such as the density-based operation policy configuration engines described in this paper, can configure the network device to operate according to the density-based operation policy in providing access to the network services. In configuring the network device to operate according to the density-based operation policy hardware elements and/or systems of the network device can be controlled according to the density-based operation policy as it is continuing to provide access to the network services. The network device can be configured to operate according to the density-based operation policy if a density-based performance trigger of the policy signaling to start operating according to the policy is actually met.

The flowchart 800 continues to module 806, where a neighboring network device to the network device is determined. An applicable engine for determining neighboring network devices, such as the neighboring network device identification engines described in this paper, can determine a neighboring network device to the network device. A neighboring network device can be determined based on a wireless signal received from the neighboring network device. For example, if a strength of a signal received from a network device falls above a threshold value, e.g. −70 dbM or a specific RSSI value, then it can be determined that the network device is a neighboring network device.

The flowchart 800 continues to module 808, where it is determined if the density-based operation policy includes a standby notification command. An applicable engine for configuring a network device to operate according to a density-based operation policy, such as the density-based operation policy configuration engines described in this paper, can determine if the density-based operation policy includes a standby notification command. Whether the density-based operation policy includes a standby notification command can be determined from density-based operation policy data provided to the network device.

The flowchart 800 continues to module 810, where a standby notification is sent to the neighboring network device if it is determined that the density-based operation policy includes the standby notification command. An applicable engine for communicating with network devices in a LAN, such as the LAN communication engines described in this paper, can send a standby notification to the neighboring network device. A standby notification can be sent to the neighboring network device in response to instructions from an applicable system for configuring a network device to operate according to a density-based operation policy, such as the density-based operation policy configuration engines described in this paper.

Figure 9:
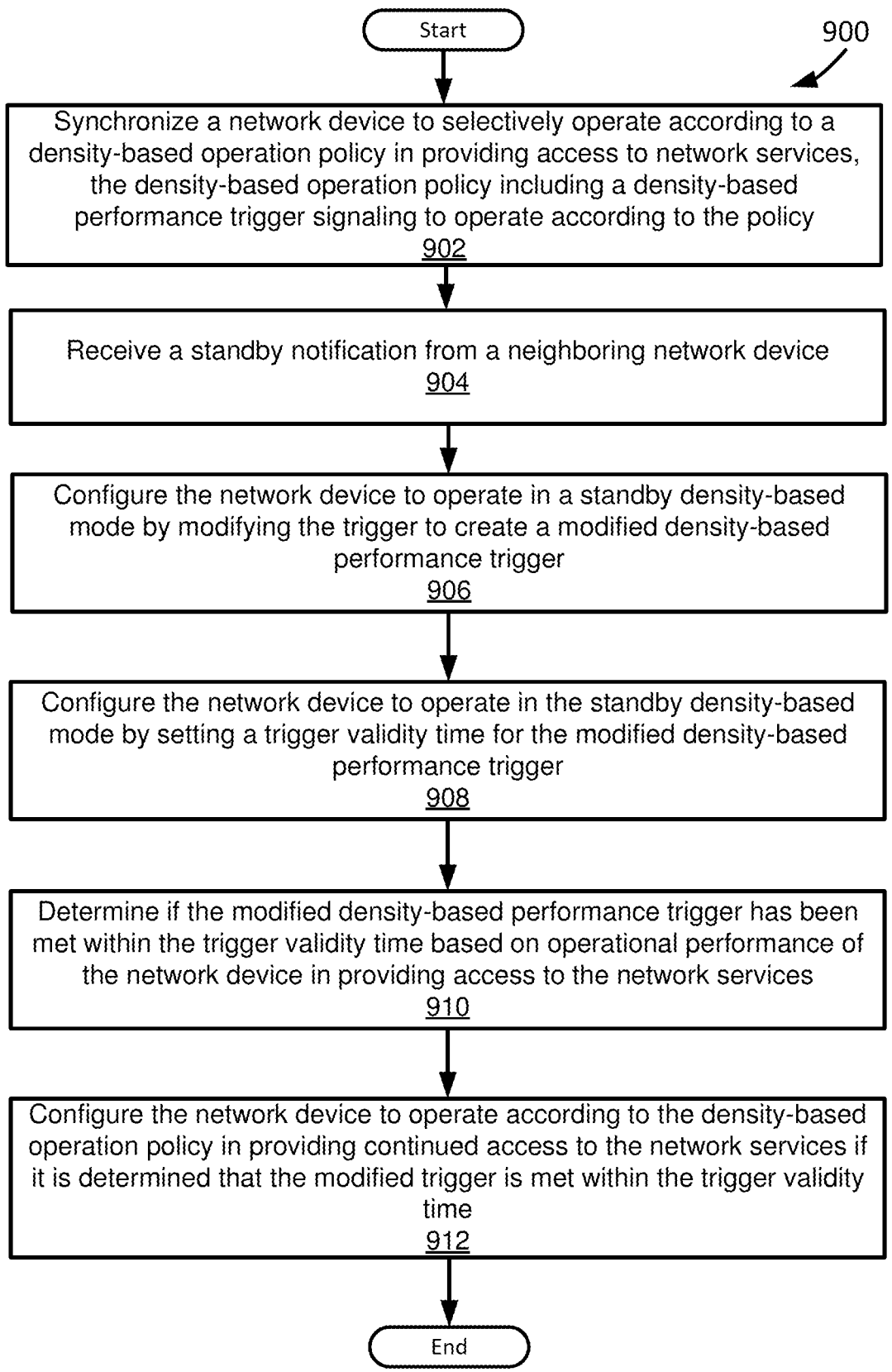
FIG. 9 depicts a flowchart of an example of a method for configuring a network device to operate in a standby density-based mode in providing access to network services.

FIG. 9 depicts a flowchart 900 of an example of a method for configuring a network device to operate in a standby density-based mode in providing access to network services. The flowchart 900 begins at module 902, where a network device is synchronized to operate according to a density-based operation policy in providing access to network services. A density-based operation policy includes a density-based performance trigger signaling to operate according to the policy. An applicable engine for synchronizing network devices to operate according to a density-based operation policy, such as the density-based operation policy synchronization engines described in this paper, can synchronize a network device to operate according to the density-based operation policy in providing access to network services. As part of synchronizing a network device, a density-based operation policy can be provided to the network device.

The flowchart 900 continues to module 904, where a standby notification is received at the network device from a neighboring network device. An applicable engine for communicating with network devices in a LAN, such as the LAN communication engines described in this paper, can receive a standby notification at the network device from a neighboring network device. A standby notification can be received at the network device from a neighboring network device through a LAN back-end or a wireless connection directly connecting the two devices together.

The flowchart 900 continues to module 906, where the network device is configured to operate in a standby density-based mode by modifying the performance trigger of the density-based operation policy. An applicable engine for configuring a network device to operate in a standby density-based mode, such as the density-based standby configuration engines described in this paper, can configure the network device to operate in a standby density-based mode by modifying the performance trigger of the density-based operation policy.

The flowchart 900 continues to module 908, where the network device is configured to operate in the standby density-based mode by setting a trigger validity time for the modified density-based performance trigger, created at module 906. An applicable engine for configuring a network device to operate in a standby density-based mode, such as the density-based standby configuration engines described in this paper, can configure the network device to operate in the standby density-based mode by setting a trigger validity time for the modified density-based performance trigger.

The flowchart 900 continues to module 910, where it is determined if the modified density-based performance trigger has been met within the trigger validity time based on operational performance of the network device in providing access to the network services. An applicable engine for determining whether a density-based performance trigger has been met, such as the density-based performance trigger evaluation engines described in this paper, can determine whether the modified density-based performance trigger has been met within the trigger validity time according to operational performance of the network device in providing access to network service. The network device can be operating according to a different operation policy than the density-based operation policy in providing access to network services for purposes of determining if the modified density-based performance trigger has been met.

The flowchart 900 continues to module 912, where the network device is configured to operate according to the density-based operation policy in providing continued access to the network services if it is determined that the modified trigger is met within the trigger validity time. An applicable engine for configuring a network device to operate according to a density-based operation policy, such as the density-based operation policy configuration engines described in this paper, can configure the network device to operate according to the density-based operation policy in continuing to provide access to the network services if it is determined that the modified trigger is met within the trigger validity time. In configuring the network device to operate according to the density-based operation policy hardware elements and/or systems of the network device can be controlled according to the density-based operation policy as it is continuing to provide access to the network services.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

What is claimed is:

1. A method, comprising:
receiving performance statistics of a network device configured to provide access to network services to a plurality of client devices;
receiving a plurality of operation policies, each of the plurality of operation policies including operational parameters that define operations of the network device to provide access to the network services to the plurality of client devices;
self-configuring the network device to operate in accordance with a first operation policy from among the plurality of operation policies, wherein the first operation policy is based at least in part on the performance statistics;
monitoring an operational performance of the network device in providing access to the network services to the plurality of client devices according to the first operation policy;
determining whether a performance trigger is met based on the operational performance of the network device;
in response to determining that the performance trigger is met for a duration of a trigger validity time, reconfiguring the network device to operate according to a second operation policy from among the plurality of operation policies, wherein the reconfiguring comprises changing one or more of the operational parameters; and broadcasting instructions to one or more neighboring network devices to change an operation policy of the one or more neighboring network devices.

2. The method of claim 1, further comprising determining whether an other network device is a neighboring network device.

3. The method of claim 2, wherein determining whether the other network device is the neighboring network device is based on one or more of a physical location of the network device and the other network device, an automatic channel selection process, and a signal strength of a signal received from the other network device.

4. The method of claim 1, further comprising receiving instructions to change to the second operation policy.

5. The method of claim 4, further comprising, in response to receiving the instructions, modifying the performance trigger for reconfiguring the network device to operate according to the second operation policy.

6. The method of claim 5, further comprising:
assigning the trigger validity time to the modified performance trigger; and
determining whether the modified performance trigger has been met within the trigger validity time.

7. The method of claim 6, further comprising:
reconfiguring the network device to operate according to the second operation policy in response to the modified performance trigger being met within the trigger validity time; and
continuing to operate the network device according to the first operation policy in response to the modified performance trigger being unmet within the trigger validity time.

8. The method of claim 1, wherein the performance statistics comprise a number of client devices the network device serves to provide network service access.

9. The method of claim 1, wherein the operational performance of the network device corresponds to a load density of the network device.

10. A system, comprising:
a plurality of network devices in communication with one another, each network device of the plurality of network devices being configured to:
receive performance statistics of the network device configured to provide access to network services to a plurality of client devices;
receive a plurality of operation policies, each of the plurality of operation policies including operational parameters that define operations of the network device to provide access to the network services to the plurality of client devices;
self-configure the network device to operate in accordance with a first operation policy from among the plurality of operation policies, wherein the first operation policy is based at least in part on the performance statistics;
monitor an operational performance of the network device in providing access to the network services to the plurality of client devices according to the first operation policy;
determine whether a performance trigger is met based on the operational performance of the network device, wherein the performance trigger value is generated based on the performance statistics;
in response to determining that the performance trigger is met for a duration of a trigger validity time, reconfigure the network device to operate according to a second operation policy from among the plurality of operation policies, wherein the reconfiguring comprises changing one or more of the operational parameters; and
broadcast instructions to one or more neighboring network devices from among the plurality of network devices to change an operation policy of the one or more neighboring network devices.

11. The system of claim 10, wherein each network device is further configured to:
determine whether an other network device from among the plurality of network devices is a neighboring network device.

12. The system of claim 11, wherein determining whether the other network device is the neighboring network device is based on one or more of a physical location of the network device and the other network device, an automatic channel selection process, and a signal strength of a signal received from the other network device.

13. The system of claim 10, wherein each network device is further configured to:
receive instructions to change to the second operation policy;
modify the performance trigger for reconfiguring the network device to operate according to the second operation policy;
assign the trigger validity time to the modified performance trigger; and
determine whether the modified performance trigger has been met within the trigger validity time.

14. The system of claim 13, wherein each network device is configured to:
reconfigure the network device to operate according to the second operation policy in response to the modified performance trigger being met within the trigger validity time; and
continue to operate the network device according to the first operation policy in response to the modified performance trigger being unmet within the trigger validity time.

15. A network device, comprising:
a processor; and
a memory coupled to the processor storing instructions that when executed cause the processor to:
receive a plurality of operation policies, each of the plurality of operation policies including operational parameters that define operations of the network device to provide access to network services to a plurality of client devices;
self-configure a network device to operate in accordance with a first operation policy from among the plurality of operation policies;
monitor an operational performance of the network device in providing access to the network services to the plurality of client devices according to the first operation policy;
determine whether a performance trigger is met based on the operational performance of the network device;
in response to determining that the performance trigger is met for a duration of a trigger validity time, reconfigure the network device to operate according to a second operation policy from among the plurality of operation policies, wherein the reconfiguring comprises changing one or more of the operational parameters; and
broadcast instructions to one or more neighboring network devices from among the plurality of network devices to change an operation policy of the one or more neighboring network devices.

16. The network device of claim 15, wherein the processor is further configured to:
determine whether an other network device from among the plurality of network devices is a neighboring network device.

17. The network device of claim 16, wherein determining whether the other network device is the neighboring network device is based on one or more of a physical location of the network device and the other network device, an automatic channel selection process, and a signal strength of a signal received from the other network device.

18. The network device of claim 16, wherein the processor is further configured to receive, from one of the one or more neighboring network devices, instructions to change to the second operation policy.

19. The network device of claim 18, wherein the processor is further configured to, in response to receiving the instructions from the one of the one or more neighboring network devices, modify the performance trigger for reconfiguring the network device to operate according to the second operation policy.

20. The network device of claim 19, wherein the processor is further configured to:
assign the trigger validity time to the modified performance trigger;
determine whether the modified performance trigger has been met within the trigger validity time; and
reconfigure the network device to operate according to the second operation policy in response to the modified performance trigger being met within the trigger validity time or continue to operate the network device according to the first operation policy in response to the modified performance trigger being unmet within the trigger validity time.

* * * * *